Patented Aug. 7, 1945

2,380,976

UNITED STATES PATENT OFFICE

2,380,976

STABILIZED SOLUTIONS OF COPPER MERCAPTIDES

Ernest Lloyd Korb, Woodstown, N. J., and John Reginald Sabina, Media, Pa., assignors to E. I. du Pont de Nemours & Company, Wilmington, Del., a corporation of Delaware No Drawing. Application May 2, 1942, Serial No. 441,558

20 Claims. (Cl. 252—48)

This invention relates to stabilized solutions of copper mercaptides and particularly to the stabilization of solutions of copper mercaptides in hydrocarbon oils.

Copper mercaptides are the copper salts of mercaptans in which the copper has replaced the hydrogen of the sulf-hydryl group and is directed bonded to the sulfur. The copper mercaptides, derived from the aliphatic mercaptans particularly, are unstable in storage and on exposure to the atmosphere. Solutions of the copper mercaptides, derived from aliphatic mercaptans, in non-polar organic solvents and particularly in liquid hydrocarbons, are valuable compositions of commerce. The copper mercaptides are particularly valuable compounds for addition to lubricating oils in small amounts. For marketing purposes, however, and also for the purpose of providing compositions which may readily be blended with lubricating oils, it is usually desired to produce and market concentrated solutions of the copper mercaptides in liquid hydrocarbons, such as, for example, light petroleum oils, petroleum naphtha, gasoline, petroleum ether, benzene and the like. Even in such solutions, the copper mercaptides appear to change gradually, to produce a haze or discoloration in the solution which may eventually result in the precipitation of solid material during storage. This change may be accompanied by a decrease in the desirable properties and effectiveness of the composition for many of the purposes for which it is intended. For example, the effectiveness of such copper mercaptides, for stabilizing lubricating oils in internal combustion engines, may be materially reduced by such deterioration of the copper mercaptide solution and precipitation of solid material therein. In some cases, deterioration of the copper mercaptide, with material loss of effectiveness, appears to take place without the formation of a haze or precipitate. This deterioration takes place in very dilute solutions of the copper mercaptides in lubricating oils, as well as in the concentrated solutions, but is most severe in the case of the concentrated solutions.

It is an object of the present invention to provide stabilized solutions of copper mercaptides in liquid non-polar organic solvents. Another object is to inhibit the formation of color, haze and precipitates in solutions of copper mercaptides during storage. A further object is to provide concentrated solutions of copper mercaptides in liquid hydrocarbons, which solutions can be marketed and stored without substantial discoloration, formation of haze or precipitates, or substantial loss of desirable properties. Other objects are to provide new compositions of matter and to advance the art. Still other objects will appear hereinafter.

The above and other objects of our invention may be accomplished by dissolving, in a solution of a copper mercaptide, a small proportion of a soluble organic carboxylic acid whose copper salt is also soluble in the solvent to the extent of at least 0.1% at about 75° F. We have found that, when such carboxylic acids are incorporated in the solution, they inhibit, to a very large extent, the tendency for the formation of color, haze and precipitates by the copper mercaptide in the solution and loss of other desirable properties. We have been unable, as yet, to determine the manner in which the acids function or the mechanism of the reactions which may take place, whereby our results are obtained, and hence we do not wish to be limited to any theory of the operation of the acids in producing our results.

The copper mercaptides, the solutions of which are to be stabilized in accordance with our invention, are the copper mercaptides derived from aliphatic mercaptans including both the cycloaliphatic mercaptans and the open-chain aliphatic mercaptans. The aliphatic mercaptans may be unsaturated as well as saturated. Also, the mercaptans may be naturally occurring or synthetic. Preferably, the mercaptans are unsubstituted aliphatic mercaptans, that is, aliphatic mercaptans which, except for the sulf-hydro groups, consist of carbon and hydrogen. Also preferably, the mercaptans contain at least seven carbon atoms.

Desirable copper mercaptides are those derived from petroleum and petroleum products. The mercaptans, naturally present in petroleum fractions or produced therein during refining processes, may be isolated and employed for the preparation of desirable copper mercaptides. The mercaptans from petroleum fractions are usually obtained as mixtures of mercaptans of varying chain length and structure from which mixtures of copper mercaptides may be obtained. Other mercaptans may be prepared from petroleum products by various methods known to the art, such as, reacting halogenated petroleum products with sodium hydrosulfite and reacting olefines, derived from petroleum, with hydrogen sulfide. The copper mercaptides may be prepared from such mercaptans by treating the mercaptans with copper or a copper salt, such as, cupric sulfate and cupric acetate, but preferably with a cuprous salt, such as, ammoniacal cuprous chloride.

Particularly valuable copper mercaptides are those derived from cycloaliphatic mercaptans, such as, terpene mercaptans and naphthenyl mercaptans. The naphthenyl mercaptans are those obtained from naphthenes obtained from petroleum. The copper mercaptides derived from terpenes, which constitute the preferred mercaptides of our invention, are those obtained by the method disclosed in the co-pending application of Arthur L. Fox, Serial No. 440,253 filed April 23, 1942. Briefly stated, such co-pending application of Fox discloses a method which comprises heating a terpene with sulfur to form a terpene-sulfur complex, hydrogenating the terpene-sulfur complex under pressure in the presence of a sulf-active hydrogenation catalyst to reduce the complex to a mercaptan and then reacting the mercaptan with a copper salt to produce the copper mercaptide. Particularly suitable mercaptides are those prepared in accordance with the process of such co-pending application from Alpha-pinene
Beta-pinene
Dipentene
Terpinolene
Menthene
Alpha-terpineol
Camphene
Pine oil
Terpentine
Camphor oils
Terpenes obtained as by-products in the manufacture of synthetic camphor Particularly desirable copper mercaptides are those prepared from alpha-pinene, camphene and menthene, since they are soluble in liquid hydrocarbons, and particularly in lubricating oils, to such an extent that concentrated solutions may be readily prepared. For example, the copper mercaptides derived from alpha-pinene were found to be soluble in a representative S. A. E. #10 oil to the extent of at least 34% by weight and the copper mercaptides derived from camphene and menthene are soluble in such oil to the extent of more than 4% by weight.

The solvents in which the copper mercaptides are dissolved, are the liquid non-polar organic solvents. The particular solvent, in any case, will depend upon the use to which the solution is to be put. Representative solvents are lubricating oils, aromatic hydrocarbons, volatile petroleum distillates, such as, petroleum naphtha, petroleum ether, gasoline, ethers, esters, ketones and halogenated solvents. For most purposes, it will be desired to employ liquid hydrocarbons as the solvents.

The amount of the mercaptide dissolved in the solvent will vary with the use to which the solution will be put. When the copper mercaptide is to be employed in a lubricating oil for lubricating an internal combustion engine, it will usually be dissolved in the oil in such proportion as to provide a concentration of from 50 to about 1000 parts of copper per million parts of oil. On the other hand, when it is desired to provide a composition for addition to the lubricating oil, the composition is preferably a concentrated solution of the copper mercaptide in a liquid hydrocarbon and particularly in a lubricating oil. Naturally, the concentration of the copper mercaptide in the solution will also vary with the mercaptide and the solvent as well as the desire of the user.

The organic carboxylic acid to be employed must necessarily be one which is soluble in the particular solvent and also should be such that its copper salts are soluble in the solvent to the extent of at least 0.1% by weight. Preferably, the carboxylic acid should be an aliphatic carboxylic acid and particularly should be an unsubstituted aliphatic carboxylic acid, that is, one which consists of the elements carbon, hydrogen and oxygen. The aliphatic carboxylic acids include both the open-chain and the cycloaliphatic acids and the unsaturated as well as the saturated acids. We particularly prefer to employ the naturally occurring acids, such as, naphthenic acids, oleic acid, stearic acid and palmitic acid. Of these, the naphthenic acids appear to be the most desirable and the most effective. The naphthenic acids are generally obtained from petroleum as a mixture of several of such acids. Such mixtures of naphthenic acids are entirely suitable for use in accordance with our invention.

The amount of the acid, employed in any particular case, will depend upon the amount of the copper mercaptide present in the solution, the character of the solvent, the degree of stabilization desired and the use to which the solution is to be put. We have found that as little as 10% of the acid, based on the weight of the copper mercaptide, to be effective to very materially inhibit the formation of haze, precipitates and discoloration. Also, as much as one part of acid for each part of copper mercaptide is quite effective. Generally, we prefer to employ the acid in the range of from about 10% to about 50% by weight of the metal salt. When the solvent is a lubricating oil, which is to be employed in an internal combustion engine provided with bearing metals which are sensitive to corrosion, the acid generally should not exceed about 0.1% by weight of the lubricant so as to avoid any tendency toward corrosion of bearing metals. Preferably, in the case of a lubricating oil, we employ the acid in the proportion of from about 0.02% to about 0.05% of the weight of the oil. When a concentrated solution of the copper mercaptide is prepared for addition to a lubricating oil, the amount of acid in such composition should be regulated to provide the desired concentration of acid in the final diluted condition in the lubricant.

It is customary, in the investigation of storage stability of oils and other liquids, to accelerate the phenomena under observation by maintaining the samples at elevated temperatures, thereby obtaining the equivalent of room temperature storage in considerably shorter time. In Table I, we have given the results of tests illustrating the effectiveness of acids in improving the storage stability of oils containing a representative copper mercaptide, the copper mercaptide derived from alpha-pinene. All samples were stored under the conditions indicated in stoppered glass bottles, filled with the oil solution to approximately one-half their height, the balance of the space in the bottles being occupied by air. We have included accelerated tests, as well as sunlight and dark storage tests at room temperature.

Oil A, was a solvent extracted Pennsylvania base oil of S. A. E. #10 grade and oil B, was an acid treated Coastal base oil of S. A. E. #30 grade. The naphthenic acid was a mixture of the naphthenic acids from petroleum and had an average molecular weight of 230.

Table I

| Oil | Compound added to oil | Hours to form precipitate | | |
|---|---|---|---|---|
| | | Sunlight | 80° F. (dark) | 118° F. (dark) |
| A | 0.2% CPM [1] | >3,000 | 575 | 24 |
| A | 0.2% CPM [1]+0.02% naphthenic acid. | >3,000 | >3,000 | |
| A | 0.2% CPM [1]+0.05% naphthenic acid. | >3,000 | >3,000 | >3,000 |
| A | 0.2% CPM [1]+0.10% naphthenic acid. | >3,000 | | >3,000 |
| A | 0.2% CPM [1]+0.05% oleic acid. | >3,000 | | >3,000 |
| A | 0.2% CPM [1]+0.05% stearic acid. | >3,000 | | >3,000 |
| A | 0.2% CPM [1]+0.05% palmitic acid. | >3,000 | | 1,280 |
| A | 0.2% CPM [1]+0.05% (40 naphthenic+60 oleic acids). | >3,000 | >3,000 | |
| A | 0.2% CPM [1]+0.10% (40 naphthenic+60 oleic acids). | >3,000 | >3,000 | |
| B | 0.2% CPM [1] | 5 | | 120 |
| B | 0.2% CPM [1]+0.05% naphthenic acid. | >3,000 | | >3,000 |
| B | 0.2% CPM [1]+0.10% naphthenic acid. | >3,000 | | >3,000 |
| B | 0.2% CPM [1]+0.05% oleic acid. | 283 | | >3,000 |
| B | 0.2% CPM [1]+0.05% stearic acid. | 48 | | 280 |
| B | 0.2% CPM [1]+0.05% palmitic acid. | 790 | | 380 |
| B | 0.2% CPM [1]+0.05% (40 naphthenic+60 oleic acids). | >3,000 | | |
| B | 0.2% CPM [1]+0.10% (40 naphthenic+60 oleic acids). | >3,000 | | |

[1] Copper mercaptide derived from alpha-pinene.
All percentages are by weight.

It will be apparent from the above tests that oil A, containing the copper mercaptide, derived from alpha-pinene, was stable in sunlight but developed sediment after 575 hours at room temperature and after 24 hours at 118° F. The addition of small amounts of representative acids of our invention, to such oil solutions prevented haze formation and precipitation up to and including the time of the last examination the sample recorded. The acids were not equally effective in oil B, but in every case produced a very marked improvement in the stability of the solution.

Table II discloses the results obtained with different mercaptides in different solvents. In these experiments, sufficient of the copper mercaptide was added to each solvent to make a 6% solution and any undissolved material was filtered off. Since the mercaptides were not all soluble in all these solvents to the extent of 6%, the resulting resolutions contained from about 0.05% to about 6% of copper mercaptide based on the solvent. Each solution was divided into portions, one of which was not treated and the others of which were treated with small amounts of oleic acid and naphthenic acid. The acid was added in the proportion of three drops for each 10 cc. of solution. The samples were flushed with oxygen and allowed to stand at room temperature for 65 hours. At the end of this time, the untreated solutions exhibited definite evidence of deterioration as shown by the formation of a haze or precipitate. Those samples which exhibited less deterioration than the untreated samples are indicated in the table by a + sign and those which did not disclose any improvement in deterioration would be designated by a 0 sign.

Table II

| Copper mercaptide | Solvent | Oleic acid | Naphthenic acid |
|---|---|---|---|
| Copper mercaptide derived from alpha-pinene. | Carbon tetrachloride | + | + |
| Do | Chloroform | + | + |
| Do | A. S. T. M. naphtha | + | + |
| Do | Xylene | + | + |
| Do | Benzene | + | + |
| Do | Ethyl acetate | + | + |
| Do | Methyl ethyl ketone | + | + |
| Do | Diethyl ether | + | + |
| Copper mercaptide derived from cetene. | Xylene | + | + |
| Do | Solvent extracted Mid-Continent base S. A. E. 10 oil. | + | + |
| Copper pentadecyl-8 mercaptide. | Xylene | + | + |
| Copper-2-methyl pentane-4-mercaptide. | do | + | + |

In another series of tests, solutions were made up with the copper mercaptide derived from camphene, the copper mercaptide derived from beta-pinene, the copper mercaptide derived from dipentene and copper pentadecyl-8-mercaptide, respectively, in a solvent extracted Mid-Continent base S. A. E. #20 oil, in such concentrations as to provide 500 parts of copper per million parts of oil, in each case. Naphthenic acid was added to a sample of each solution in such proportion as to provide four parts by weight of acid to each five parts of copper. The samples, containing the acid, and corresponding samples, containing no acid, were stored in the dark at 150° F., in the same manner as the samples of Table I. In each case, the acid very materially improved the stability of the solutions toward the formation of haze and precipitates.

The acids may be incorporated in the solutions of the copper mercaptides at any convenient stage in the preparation. The acids may be added to the solvent prior to dissolving the copper mercaptide therein, may be added with the copper mercaptide or may be added after solution of the mercaptide in the solvent. In adding the mercaptides and the acids to the solvents, mild heating may be employed, particularly where the solvent is viscous, in order to facilitate admixture and solution. The solutions may contain other desirable materials, added for imparting other characteristics to the solutions. For example, in the case of solutions of the copper mercaptides in lubricating oils, and compositions to be added to lubricating oils, the solutions may also contain additives, such as, pour-point depressants, viscosity index improvers, thickeners, detergents, film strength improvers and the like.

We have found that in certain cases, the acids have other desirable effects. For example, when internal combustion engines are operated with low concentrations of from 50 to about 250 parts of copper to a million parts of oil, the engine cleanliness and alloy bearing corrosion appear to be markedly improved by the addition of small concentrations of carboxylic acids, in the range of 0.02 to 0.04% by weight of the oil. This acid addition need not always be made at the time of preparation of the copper compound but may also be made at the time of the engine run, with equal effectiveness.

While we have disclosed the preferred embodiments of our invention and the preferred modes of carrying the same into effect, it will be understood that the specific disclosures are for illustrative purposes only, and that various modifications may be made without departing from the spirit or scope of our invention. Accordingly, we intend to cover our invention broadly as in the appended claims.

We claim:

1. A stable solution which comprises a liquid non-polar organic solvent having dissolved therein a copper mercaptide of an aliphatic mercaptan and a small proportion, sufficient to stabilize the solution, of an organic carboxylic acid which is soluble in the solvent and whose copper salt is soluble in the solvent to the extent of at least 0.1%.

2. A stable solution which comprises a liquid non-polar organic solvent having dissolved therein a copper mercaptide of an aliphatic mercaptan and a small proportion, sufficient to stabilize the solution, of an aliphatic carboxylic acid which is soluble in the solvent and whose copper salt is soluble in the solvent to the extent of at least 0.1%.

3. A stable solution which comprises a liquid non-polar organic solvent having dissolved therein a copper mercaptide of an aliphatic mercaptan and a small proportion, sufficient to stabilize the solution, of an aliphatic carboxylic acid consisting of the elements carbon, hydrogen and oxygen which is soluble in the solvent and whose copper salt is soluble in the solvent to the extent of at least 0.1%.

4. A stable solution which comprises a liquid hydrocarbon having dissolved therein a copper mercaptide of an aliphatic mercaptan and a small proportion, sufficient to stabilize the solution, of a naturally occurring aliphatic carboxylic acid which is soluble in the hydrocarbon and whose copper salt is soluble in the hydrocarbon to the extent of at least 0.1%.

5. A stable solution which comprises a liquid non-polar organic solvent having dissolved therein a copper mercaptide of an aliphatic mercaptan and a small proportion, sufficient to stabilize the solution, of naphthenic acids whose copper salts are soluble in the solvent to the extent of at least 0.1%.

6. A stable solution which comprises a liquid non-polar organic solvent having dissolved therein a copper mercaptide of a cycloaliphatic mercaptan and a small proportion, sufficient to stabilize the solution, of an aliphatic carboxylic acid consisting of the elements carbon, hydrogen and oxygen which is soluble in the solvent and whose copper salt is soluble in the solvent to the extent of at least 0.1%.

7. A stable solution which comprises a liquid non-polar organic solvent having dissolved therein a copper mercaptide derived from a terpene and a small proportion, sufficient to stabilize the solution, of an aliphatic carboxylic acid consisting of the elements carbon, hydrogen and oxygen which is soluble in the solvent and whose copper salt is soluble in the solvent to the extent of at least 0.1%.

8. A stable solution which comprises a liquid non-polar organic solvent having dissolved therein a copper mercaptide derived from alpha-pinene and a small proportion, sufficient to stabilize the solution, of an aliphatic carboxylic acid consisting of the elements carbon, hydrogen and oxygen which is soluble in the solvent and whose copper salt is soluble in the solvent to the extent of at least 0.1%.

9. A stable solution which comprises a liquid hydrocarbon having dissolved therein a copper mercaptide derived from a terpene and a small proportion, sufficient to stabilize the solution, of an aliphatic carboxylic acid which is soluble in the hydrocarbon and whose copper salt is soluble in the hydrocarbon to the extent of at least 0.1%.

10. A stable solution which comprises a liquid hydrocarbon having dissolved therein a copper mercaptide derived from a terpene and a small proportion, sufficient to stabilize the solution, of a naturally occurring aliphatic carboxylic acid which is soluble in the hydrocarbon and whose copper salt is soluble in the hydrocarbon to the extent of at least 0.1%.

11. A stable solution which comprises a liquid hydrocarbon having dissolved therein a copper mercaptide derived from a terpene and a small proportion, sufficient to stabilize the solution, of naphthenic acids whose copper salts are soluble in the hydrocarbon to the extent of at least 0.1%.

12. A stable solution which comprises a liquid hydrocarbon having dissolved therein a copper mercaptide derived from alpha-pinene and a small proportion, sufficient to stabilize the solution, of a naturally occurring aliphatic carboxylic acid which is soluble in the hydrocarbon and whose copper salt is soluble in the hydrocarbon to the extent of at least 0.1%.

13. A stable solution which comprises a petroleum oil having dissolved therein a copper mercaptide of an aliphatic mercaptan and a small proportion, sufficient to stabilize the solution, of an organic carboxylic acid which is soluble in the oil and whose copper salt is soluble in the oil to the extent of at least 0.1%.

14. A stable solution which comprises a petroleum oil having dissolved therein a copper mercaptide derived from a terpene and a small proportion, sufficient to stabilize the solution, of an aliphatic carboxylic acid consisting of the elements carbon, hydrogen and oxygen which is soluble in the oil and whose copper salt is soluble in the oil to the extent of at least 0.1%.

15. A stable solution which comprises a petroleum oil having dissolved therein a copper mercaptide derived from alpha-pinene and a small proportion, sufficient to stabilize the solution, of an aliphatic carboxylic acid consisting of the elements carbon, hydrogen and oxygen which is soluble in the oil and whose copper salt is soluble in the oil to the extent of at least 0.1%.

16. A stable solution which comprises a petroleum oil having dissolved therein a copper mercaptide derived from alpha-pinene and a small proportion, sufficient to stabilize the solution, of naphthenic acids whose copper salts are soluble in the oil to the extent of at least 0.1%.

17. A stable solution which comprises a liquid non-polar organic solvent having dissolved therein a copper mercaptide of an aliphatic mercaptan in an amount sufficient to provide a concentrated solution and a small proportion, sufficient to stabilize the solution, of an aliphatic carboxylic acid which is soluble in the solvent and whose copper salt is soluble in the solvent to the extent of at least 0.1%.

18. A stable solution which comprises a liquid non-polar organic solvent having dissolved therein a copper mercaptide derived from alpha-pinene in an amount sufficient to provide a concentrated solution and a small proportion, sufficient to stabilize the solution, of an aliphatic carboxylic acid consisting of the elements carbon, hydrogen and oxygen which is soluble in the solvent and whose copper salt is soluble in the solvent to the extent of at least 0.1%.

19. A stable solution which comprises a petroleum oil having dissolved therein a copper mercaptide of an aliphatic mercaptan in an amount sufficient to provide a concentrated solution and a small proportion, sufficient to stabilize the solution, of an aliphatic carboxylic acid which is soluble in the oil and whose copper salt is soluble in the oil to the extent of at least 0.1%.

20. A stable solution which comprises a petroleum oil having dissolved therein a copper mercaptide derived from alpha-pinene in an amount sufficient to provide a concentrated solution and a small proportion, sufficient to stabilize the solution, of naphthenic acids whose copper salts are soluble in the oil to the extent of at least 0.1%.

ERNEST LLOYD KORB.
JOHN REGINALD SABINA.